(12) United States Patent
Okada et al.

(10) Patent No.: US 12,196,890 B2
(45) Date of Patent: *Jan. 14, 2025

(54) ELECTROMAGNETIC WAVE DETECTION APPARATUS, PROGRAM, AND INFORMATION ACQUISITION SYSTEM

(71) Applicant: KYOCERA Corporation, Kyoto (JP)

(72) Inventors: Hiroki Okada, Machida (JP); Eri Uchida, Yokohama (JP); Hiroyuki Minagawa, Yokohama (JP); Yoshiteru Takayama, Susono (JP); Mitsuo Ono, Mitaka (JP); Atsushi Hasebe, Yokohama (JP); Katsutoshi Kawai, Ichinomiya (JP); Yukitoshi Kanayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,156

(22) Filed: Sep. 19, 2023

(65) Prior Publication Data

US 2024/0012114 A1 Jan. 11, 2024

Related U.S. Application Data

(63) Continuation of application No. 16/484,787, filed as application No. PCT/JP2018/002566 on Jan. 26, 2018, now Pat. No. 11,835,653.

(30) Foreign Application Priority Data

Feb. 14, 2017 (JP) .................. 2017-025375

(51) Int. Cl.
*G01S 7/481* (2006.01)
*G01J 1/04* (2006.01)
(Continued)

(52) U.S. Cl.
CPC ........... *G01S 7/4816* (2013.01); *G01J 1/0414* (2013.01); *G01J 5/0808* (2022.01); *G01S 13/865* (2013.01);
(Continued)

(58) Field of Classification Search
None
See application file for complete search history.

(56) References Cited

U.S. PATENT DOCUMENTS 6,057,909 A 5/2000 Yahav et al.
6,091,905 A 7/2000 Yahav et al.
(Continued)

FOREIGN PATENT DOCUMENTS

CN 102422179 A 4/2012
CN 103502839 A 1/2014
(Continued)

OTHER PUBLICATIONS

U.S. Appl. No. 62/422,602, filed (Year: 2016).*
U.S. Appl. No. 62/353,291, filed (Year: 2016).*

*Primary Examiner* — Yuqing Xiao
*Assistant Examiner* — Jempson Noel
(74) *Attorney, Agent, or Firm* — Studebaker & Brackett PC (57) ABSTRACT

An electromagnetic wave detection apparatus comprises an irradiator configured to emit electromagnetic waves; a switch comprising an action surface with a plurality of pixels disposed thereon, the switch being configured to switch each pixel between a first state of causing electromagnetic waves, including reflected waves, from an object, of electromagnetic waves irradiated from the irradiator, incident on the action surface to travel in a first direction and a second state of causing the electromagnetic waves incident on the action surface to travel in a second direction; a first
(Continued)

detector configured to detect the electromagnetic waves that travel in the first direction; and a second detector configured to detect the electromagnetic waves that travel in the second direction. Also, the switch is configured to switch each of the plurality of pixels between the first and second states according to an irradiation region of the electromagnetic waves emitted from the irradiator.

5 Claims, 9 Drawing Sheets

(51) Int. Cl.
| | |
|---|---|
| *G01J 5/0808* | (2022.01) |
| *G01S 13/86* | (2006.01) |
| *G01S 13/89* | (2006.01) |
| *G01S 17/894* | (2020.01) |
| *G02B 26/08* | (2006.01) |
| *G02F 1/29* | (2006.01) |

(52) U.S. Cl.
CPC ............ *G01S 13/89* (2013.01); *G01S 17/894* (2020.01); *G02B 26/0833* (2013.01); *G02F 1/29* (2013.01)

(56) References Cited

U.S. PATENT DOCUMENTS

| | | | |
|---|---|---|---|
| 7,177,496 B1 | 2/2007 | Polynkin et al. | |
| 7,245,363 B2 | 7/2007 | Mushika | |
| 7,965,327 B2* | 6/2011 | Gough | H04N 23/71 |
| | | | 348/294 |
| 9,557,856 B2 | 1/2017 | Send et al. | |
| 9,689,667 B2 | 6/2017 | Royo Royo et al. | |
| 2003/0132405 A1 | 7/2003 | Some | |
| 2005/0224695 A1 | 10/2005 | Mushika | |
| 2007/0216769 A1 | 9/2007 | Zganec et al. | |
| 2011/0074983 A1 | 3/2011 | Bush | |
| 2013/0281155 A1* | 10/2013 | Ogata | H02J 50/402 |
| | | | 455/556.1 |
| 2014/0049783 A1 | 2/2014 | Royo Royo et al. | |
| 2015/0177911 A1 | 6/2015 | Hsiao et al. | |
| 2015/0378023 A1 | 12/2015 | Royo Royo et al. | |
| 2017/0357000 A1* | 12/2017 | Bartlett | G01S 7/4817 |
| 2018/0038958 A1 | 2/2018 | Kawazoe et al. | |
| 2019/0271767 A1* | 9/2019 | Keilaf | G01S 17/931 |

FOREIGN PATENT DOCUMENTS

| | | |
|---|---|---|
| DE | 10 2005 049 471 A1 | 5/2007 |
| EP | 1 102 104 A2 | 5/2001 |
| EP | 2422225 B1 | 7/2015 |
| JP | S62-115389 A | 5/1987 |
| JP | H11-508359 A | 7/1999 |
| JP | 2001-201699 A | 7/2001 |
| JP | 2004-163271 A | 6/2004 |
| JP | 2004-279197 A | 10/2004 |
| JP | 2004-294106 A | 10/2004 |
| JP | 2005-514615 A | 5/2005 |
| JP | 2008-128792 A | 6/2008 |
| JP | 2011-220732 A | 11/2011 |
| JP | 2016-180624 A | 10/2016 |
| JP | 2017-015611 A | 1/2017 |
| WO | 2004/077819 A1 | 9/2004 |

* cited by examiner

ELECTROMAGNETIC WAVE DETECTION APPARATUS, PROGRAM, AND INFORMATION ACQUISITION SYSTEM

CROSS-REFERENCE TO RELATED APPLICATION

This present application is a Continuation of U.S. patent application Ser. No. 16/484,787 filed Aug. 8, 2019, which is the U.S. National Stage of International Application No. PCT/JP2018/002566 filed Jan. 26, 2018, which claims priority to and the benefit of Japanese Patent Application No. 2017-025375 filed Feb. 14, 2017, the entire contents of which are incorporated herein by reference.

TECHNICAL FIELD

The present disclosure relates to an electromagnetic wave detection apparatus, a program, and an information acquisition system.

BACKGROUND

In recent years, apparatuses have been developed to acquire information related to the surroundings from the results of detection by a plurality of detectors that detect electromagnetic waves. For example, an apparatus that uses laser radar to measure the position of an object in an image captured by an infrared camera is known, as in patent literature (PTL) 1.

CITATION LIST

Patent Literature

PTL 1: JP2011-220737

SUMMARY

An electromagnetic wave detection apparatus comprises an irradiator configured to emit electromagnetic waves; and a switch comprising an action surface with a plurality of pixels disposed thereon. The switch is configured to switch each pixel between a first state of causing electromagnetic waves, including reflected waves, from an object, of electromagnetic waves irradiated from the irradiator, incident on the action surface to travel in a first direction and a second state of causing the electromagnetic waves incident on the action surface to travel in a second direction. The electromagnetic wave detection apparatus further comprises a first detector configured to detect the electromagnetic waves that travel in the first direction; and a second detector configured to detect the electromagnetic waves that travel in the second direction. Also, the switch is configured to switch each of the plurality of pixels between the first state and the second state according to an irradiation region of the electromagnetic waves emitted from the irradiator.

DETAILED DESCRIPTION

Embodiments of an electromagnetic wave detection apparatus to which the present disclosure is applied are described below with reference to the drawings. In a configuration for detecting electromagnetic waves with a plurality of detectors that each detect electromagnetic waves, the detection axis of each detector differs. Therefore, even if each detector detects electromagnetic waves in the same region, the coordinate system of the detection results differs between detectors. It is therefore helpful to reduce the difference between coordinate systems in the detection results of the detectors. It is difficult or impossible, however, to reduce this difference by correction. The electromagnetic wave detection apparatus to which the present disclosure is applied therefore reduces the difference between coordinate systems in the detection results of detectors by being configured to reduce the difference between the detection axes of the detectors.

Figure 1:
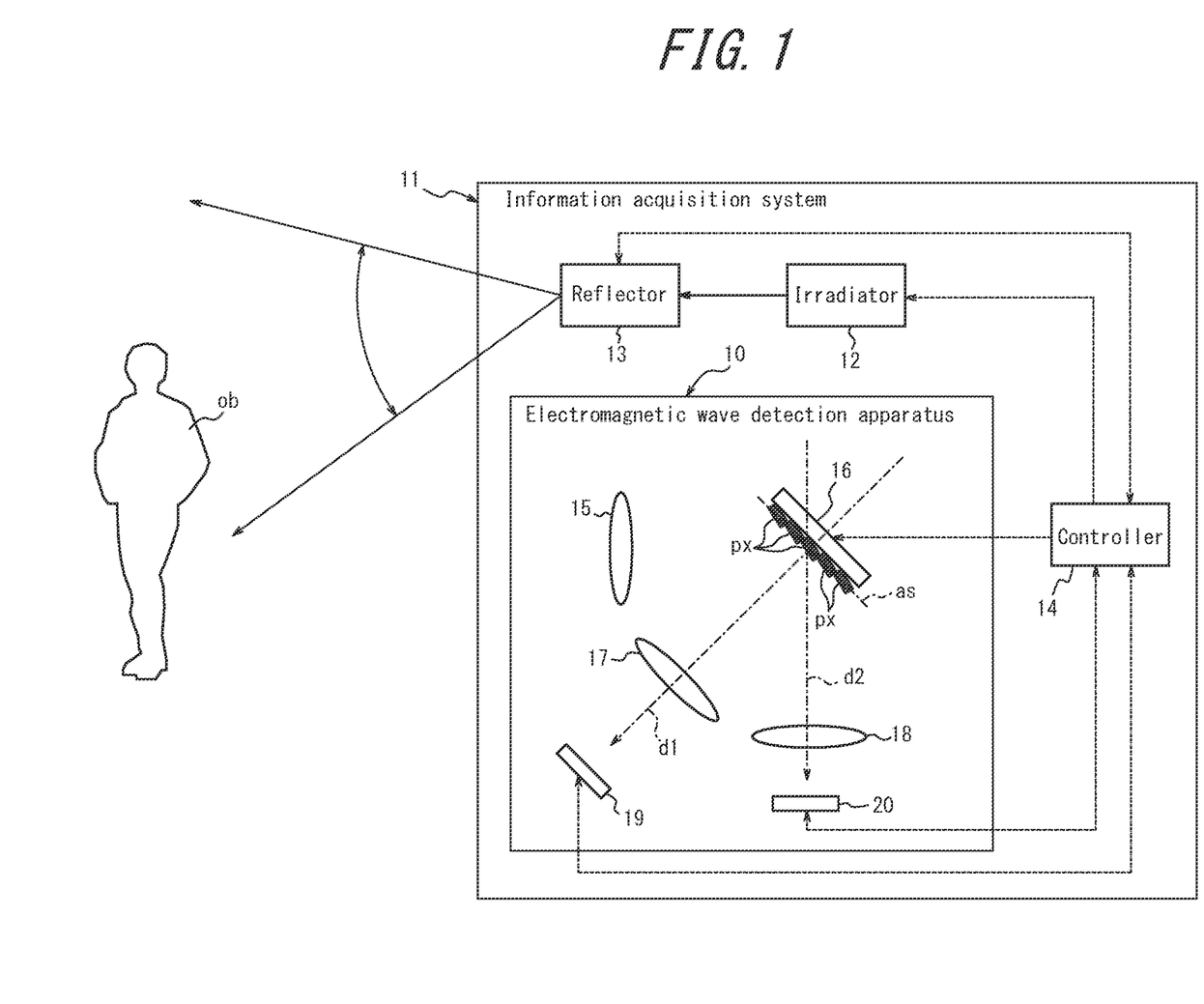
FIG. 1 is a configuration diagram schematically illustrating an information acquisition system that includes an electromagnetic wave detection apparatus according to a first embodiment.

As illustrated in FIG. 1, an information acquisition system 11 that includes an electromagnetic wave detection apparatus 10 according to a first embodiment of the present disclosure is configured to include the electromagnetic wave detection apparatus 10, an irradiator 12, a reflector 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The electromagnetic wave detection apparatus 10 includes a pre-stage optical system 15, a switch 16, a first post-stage optical system 17, a second post-stage optical system 18, a first detector 19, and a second detector 20.

The pre-stage optical system 15 includes either or both of a lens and a mirror, for example, and forms an image of an object ob that becomes a subject of imaging.

It suffices for the switch 16 to be provided at or near a primary image formation position, which is the position where the image of the object ob located at a predetermined position separate from the pre-stage optical system is formed by the pre-stage optical system 15. In the first embodiment, the switch 16 is provided at the primary image formation position. The switch 16 has an action surface as on which electromagnetic waves that pass through the pre-stage optical system 15 are incident. The action surface as is formed by a plurality of pixels px aligned in a two-dimensional pattern. The action surface as is a surface that, in at least one of the first state and the second state described below, produces an effect on the electromagnetic waves such as reflection and transmission.

The switch 16 can switch each pixel px between a first state of causing the electromagnetic waves incident on the action surface as to travel (propagate, advance) in a first direction d1 and a second state of causing the electromagnetic waves to travel (propagate, advance) in a second direction d2. In the first embodiment, the first state is a first reflecting state of reflecting the electromagnetic waves incident on the action surface as towards the first direction d1. The second state is a second reflecting state of reflecting the electromagnetic waves incident on the action surface as towards the second direction d2.

In greater detail, the switch 16 of the first embodiment includes a reflecting surface that reflects the electromagnetic waves on each pixel px. The switch 16 switches each pixel px between the first reflecting state and the second reflecting state by changing the direction of the reflecting surface of each pixel px. In the first embodiment, the switch 16 includes a digital micro mirror device (DMD), for example. The DMD can drive minute reflecting surfaces that configure the action surface as to switch the reflecting surface on each pixel px between inclined states of +12° and −12° relative to the action surface as. The action surface as is parallel to the board surface of a substrate on which the minute reflecting surfaces are mounted in the DMD.

Figure 2:
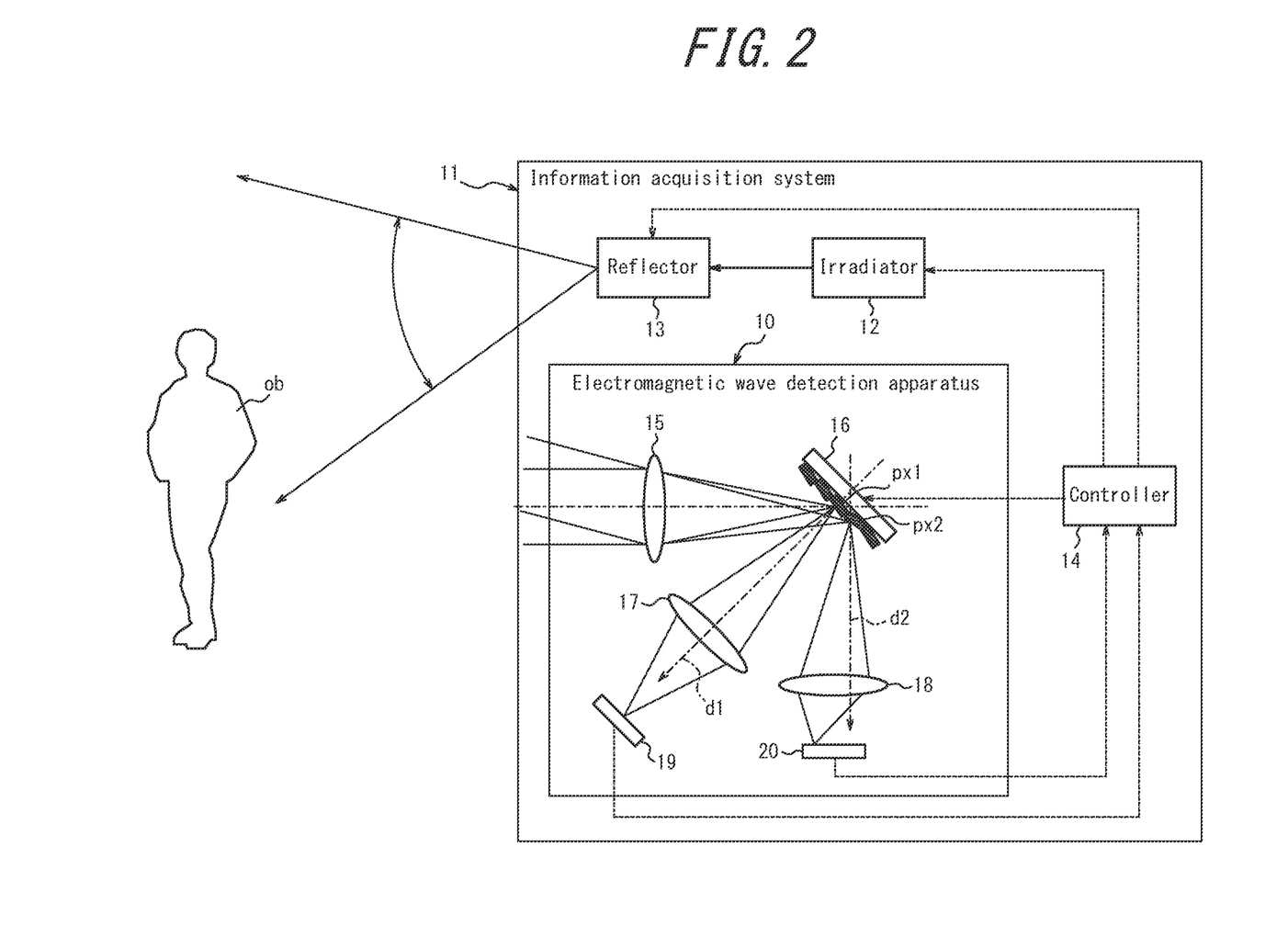
FIG. 2 is a configuration diagram of the information acquisition system to illustrate the travel direction of electromagnetic waves in a first state and a second state of pixels in a switch of the electromagnetic wave detection apparatus of FIG. 1.

The switch 16 switches each pixel px between the first state and the second state based on control by the controller 14, described below. For example, as illustrated in FIG. 2, the switch 16 can simultaneously cause electromagnetic waves incident on a portion of pixels px1 to travel (propagate, advance) in the first direction d1 by switching the pixels px1 to the first state and cause electromagnetic waves incident on another portion of pixels px2 to travel (propagate, advance) in the second direction d2 by switching the pixels px2 to the second state. The switch 16 can also cause the electromagnetic waves incident on the same pixel px to travel (propagate, advance) in the second direction d2 after the first direction d1 by switching the pixel px from the first state to the second state.

As illustrated in FIG. 1, the first post-stage optical system 17 is provided in the first direction d1 from the switch 16. The first post-stage optical system 17 includes either or both of a lens and a mirror, for example. The first post-stage optical system 17 forms an image of the object ob represented by the electromagnetic waves whose travel direction is switched at the switch 16.

The second post-stage optical system 18 is provided in the second direction d2 from the switch 16. The second post-stage optical system 18 includes either or both of a lens and a mirror, for example. The second post-stage optical system 18 forms an image of the object ob represented by the electromagnetic waves whose travel direction is switched at the switch 16.

The first detector 19 is provided along the path of electromagnetic waves that travel (propagate, advance) through the first post-stage optical system 17 after traveling (propagating, advancing) in the first direction d1 due to the switch 16. The first detector 19 detects the electromagnetic waves that pass through the first post-stage optical system 17, i.e. electromagnetic waves that travel (propagate, advance) in the first direction d1.

In the first embodiment, the first detector 19 is a passive sensor. In greater detail, the first detector 19 in the first embodiment includes a device array. For example, the first detector 19 includes an imaging device such as an image sensor or an imaging array, captures the image formed from electromagnetic waves at a detection surface, and generates image information corresponding to the imaged object ob. In greater detail, the first detector 19 in the first embodiment captures a visible light image. The first detector 19 in the first embodiment transmits the generated image information to the controller 14 as a signal.

The first detector 19 may capture an image other than a visible light image, such as an infrared light image. The first detector 19 may include a thermo sensor. In this configuration, the electromagnetic wave detection apparatus 10 can acquire temperature information with the first detector 19.

In this way, the first detector 19 in the first embodiment includes a device array. Therefore, when an image is formed on the detection surface by incident electromagnetic waves, the image formed from the electromagnetic waves is incident on each device of the first detector 19 in the first embodiment, allowing an improvement in resolution. The first detector 19 is therefore preferably provided at a secondary image formation position, which is a position of image formation by the first post-stage optical system 17.

The second detector 20 is provided along the path of electromagnetic waves that travel (propagate, advance) through the second post-stage optical system 18 after traveling (propagating, advancing) in the second direction d2 from the switch 16. The second detector 20 detects electromagnetic waves that pass through the second post-stage optical system 18, i.e. electromagnetic waves that travel (propagate, advance) in the second direction d2.

In the first embodiment, the second detector 20 is an active sensor that detects reflected waves, from the object ob, of electromagnetic waves irradiated towards the object ob from the irradiator 12. The second detector 20 in the first embodiment detects reflected waves, from the object ob, of electromagnetic waves irradiated towards the object ob after being irradiated from the irradiator 12 and reflected by the reflector 13. As described below, the electromagnetic waves irradiated from the irradiator 12 are infrared rays, and the second detector 20 detects different electromagnetic waves than the first detector 19.

In greater detail, the second detector 20 of the first embodiment includes a device configured as a ranging sensor. For example, the second detector 20 includes a single device such as an Avalanche PhotoDiode (APD), a Photo-Diode (PD), or a ranging image sensor. The second detector 20 may include a device array, such as an APD array, a PD array, a ranging imaging array, or a ranging image sensor. The second detector 20 of the first embodiment transmits detection information, indicating the detection of reflected waves from the subject, to the controller 14 as a signal. In greater detail, the second detector 20 detects electromagnetic waves in the infrared light band.

It suffices for the single device configured as the above-described ranging sensor in the second detector 20 to be capable of detecting electromagnetic waves. Image formation at the detection surface is not required. The second detector 20 therefore need not be provided at a secondary image formation position, which is a position of image formation by the second post-stage optical system 18. In other words, as long as electromagnetic waves from all angles of view can be incident on the detection surface, the second detector with this configuration may be disposed at any position along the path of electromagnetic waves that travel (propagate, advance) in the second direction d2, due to the switch 16, and subsequently pass through the second post-stage optical system 18.

The irradiator 12 emits at least one of infrared rays, visible light rays, ultraviolet rays, and radio waves. In the first embodiment, the irradiator 12 emits infrared rays. The irradiator 12 irradiates the electromagnetic waves towards the object ob either indirectly via the reflector 13 or directly. In the first embodiment, the irradiator 12 irradiates the electromagnetic waves towards the object ob indirectly via the reflector 13.

In the first embodiment, the irradiator 12 can emit a narrow beam, for example 0.5°, of electromagnetic waves. In the first embodiment, the irradiator 12 emits pulses of electromagnetic waves. For example, the irradiator 12 includes a light emitting diode (LED), laser diode (LD), or the like. The irradiator 12 switches between emitting and not emitting electromagnetic waves based on control by the controller 14, described below.

The reflector 13 changes the irradiation position of electromagnetic waves irradiated onto the object ob by reflecting the electromagnetic waves emitted by the irradiator 12 while the orientation of the reflector 13 changes. In other words, the reflector 13 scans the object ob with the electromagnetic waves emitted from the irradiator 12. Accordingly, the second detector 20 in the first embodiment cooperates with the reflector 13 to form a scanning-type ranging sensor. The reflector 13 scans the object ob in one or two dimensions. In the first embodiment, the reflector 13 scans the object ob in two dimensions.

The reflector 13 is configured so that at least a portion of an irradiation region of the electromagnetic waves that are emitted by the irradiator 12 and reflected is included in an electromagnetic wave detection range of the electromagnetic wave detection apparatus 10. Accordingly, at least a portion of the electromagnetic waves irradiated onto the object ob via the reflector 13 can be detected by the electromagnetic wave detection apparatus 10.

In the first embodiment, the reflector 13 is configured so that at least a portion of the irradiation region of the electromagnetic waves that are emitted by the irradiator 12 and reflected by the reflector 13 is included in the detection range of the second detector 20. Accordingly, in the first embodiment, at least a portion of the electromagnetic waves irradiated onto the object ob via the reflector 13 can be detected by the second detector 20.

The reflector 13 may, for example, include a micro electro mechanical systems (MEMS) mirror, a polygon mirror, a galvano mirror, or the like. In the first embodiment, the reflector 13 includes a MEMS mirror.

Based on control by the controller 14, described below, the reflector 13 changes the direction in which electromagnetic waves are reflected. The reflector 13 may include an angle sensor, such as an encoder, and may notify the controller 14 of the angle detected by the angle sensor as information on the direction in which electromagnetic waves are reflected (direction information). With this configuration, the controller 14 can calculate the irradiation position based on the direction information acquired from the reflector 13. The controller 14 can also calculate the irradiation position based on a drive signal inputted to the reflector 13 to change the direction in which electromagnetic waves are reflected.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) and a system in a package (SiP) that have one processor or a plurality of processors working together.

The controller 14 acquires information related to the surroundings of the electromagnetic wave detection apparatus 10 based on electromagnetic waves detected by each of the first detector 19 and the second detector 20. The information related to the surroundings may, for example, be image information, distance information, and temperature information. In the first embodiment, the controller 14 acquires image information in the form of electromagnetic waves detected as an image by the first detector 19, as described above. Based on the detection information detected by the second detector 20, the controller 14 in the first embodiment also uses the time-of-flight (TOF) method to acquire distance information of the irradiation position irradiated by the irradiator 12.

Figure 3:
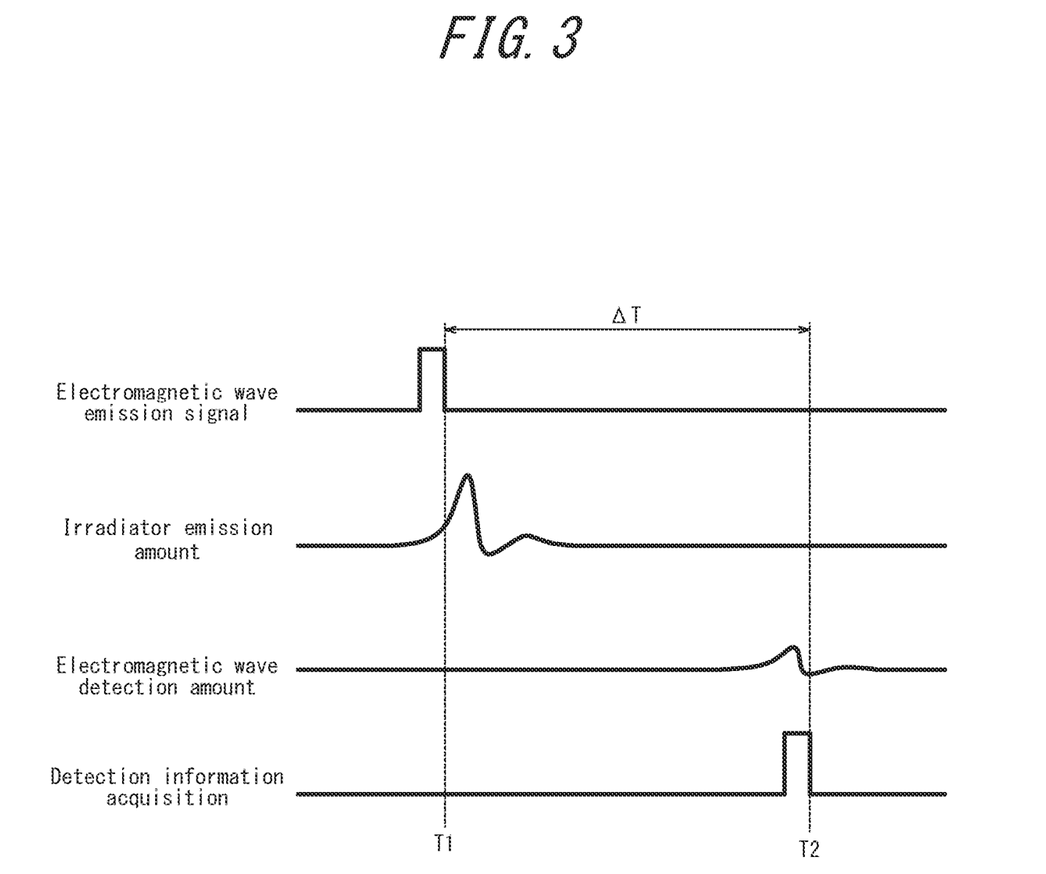
FIG. 3 is a timing chart of the timing of irradiation and detection of electromagnetic waves to illustrate the principle of ranging by a ranging sensor configured by an irradiator, a second detector, and a controller 14 of FIG. 1.

As illustrated in FIG. 3, the controller 14 causes the irradiator 12 to emit pulses of electromagnetic waves by inputting an electromagnetic wave emission signal to the irradiator 12 (see the "electromagnetic wave emission signal" section). The irradiator 12 irradiates electromagnetic waves based on the inputted electromagnetic wave emission signal (see the "irradiator emission amount" section). The electromagnetic waves emitted by the irradiator 12 and reflected by the reflector 13 to be irradiated on an arbitrary irradiation region are reflected in the irradiation region. The second detector 20 then notifies the controller 14 of detection information, as described above, when detecting electromagnetic waves reflected in the irradiation region (see the "electromagnetic wave detection amount" section).

The controller 14 may, for example, include a time measurement large scale integrated circuit (LSI) and measure a time $\Delta T$ from a timing T1 at which the controller 14 caused the irradiator 12 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position. As described above, the controller 14 calculates the irradiation position based on the direction information acquired from the reflector 13 or the drive signal that the controller 14 outputs to the reflector 13. By calculating the distance to the irradiation position while changing the irradiation position, the controller 14 creates distance information in the image information acquired from the first detector 19.

In the present embodiment, the information acquisition system 11 is configured to create distance information by direct ToF, in which the time is directly measured from when laser light is irradiated until the laser light returns, as illustrated in FIG. 3. The information acquisition system 11 is not, however, limited to this configuration. For example, the information acquisition system 11 may create distance information by flash ToF, in which electromagnetic waves are irradiated with a constant period, and the time until return is measured indirectly from the phase difference between the irradiated electromagnetic waves and the returning electromagnetic waves. The information acquisition system 11 may also create distance information by another ToF method, such as phased ToF.

The controller 14 controls the irradiator 12, the reflector 13, the switch 16, the first detector 19, and the second detector 20 to repeatedly acquire the image information and the distance information. The control of each portion to repeatedly acquire the image information and the distance information is described below with reference to the timing chart in FIG. 4.

Figure 4:
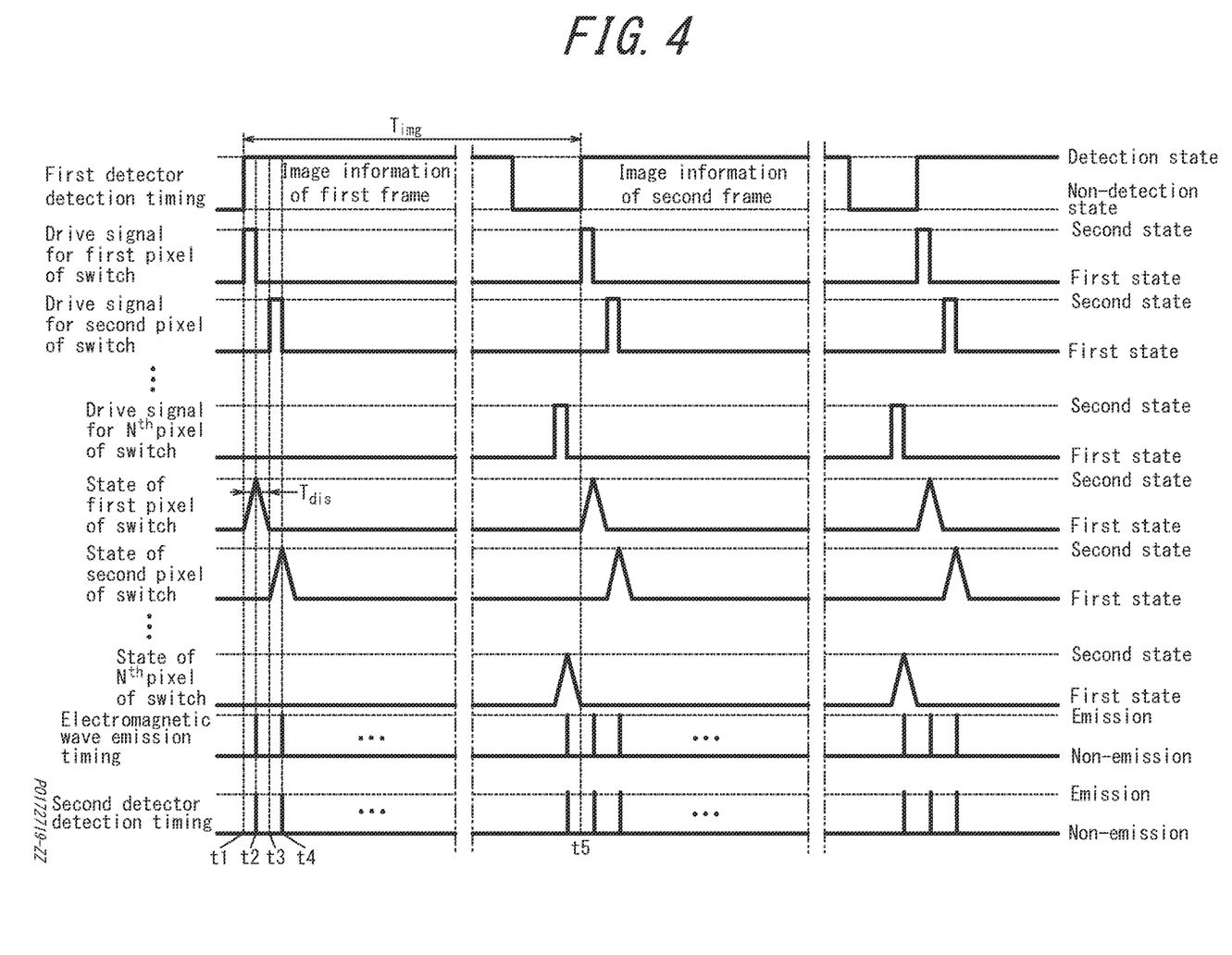
FIG. 4 is a timing chart to illustrate control of each portion for the controller to repeatedly acquire image information and distance information in the first embodiment.
Figure 5:
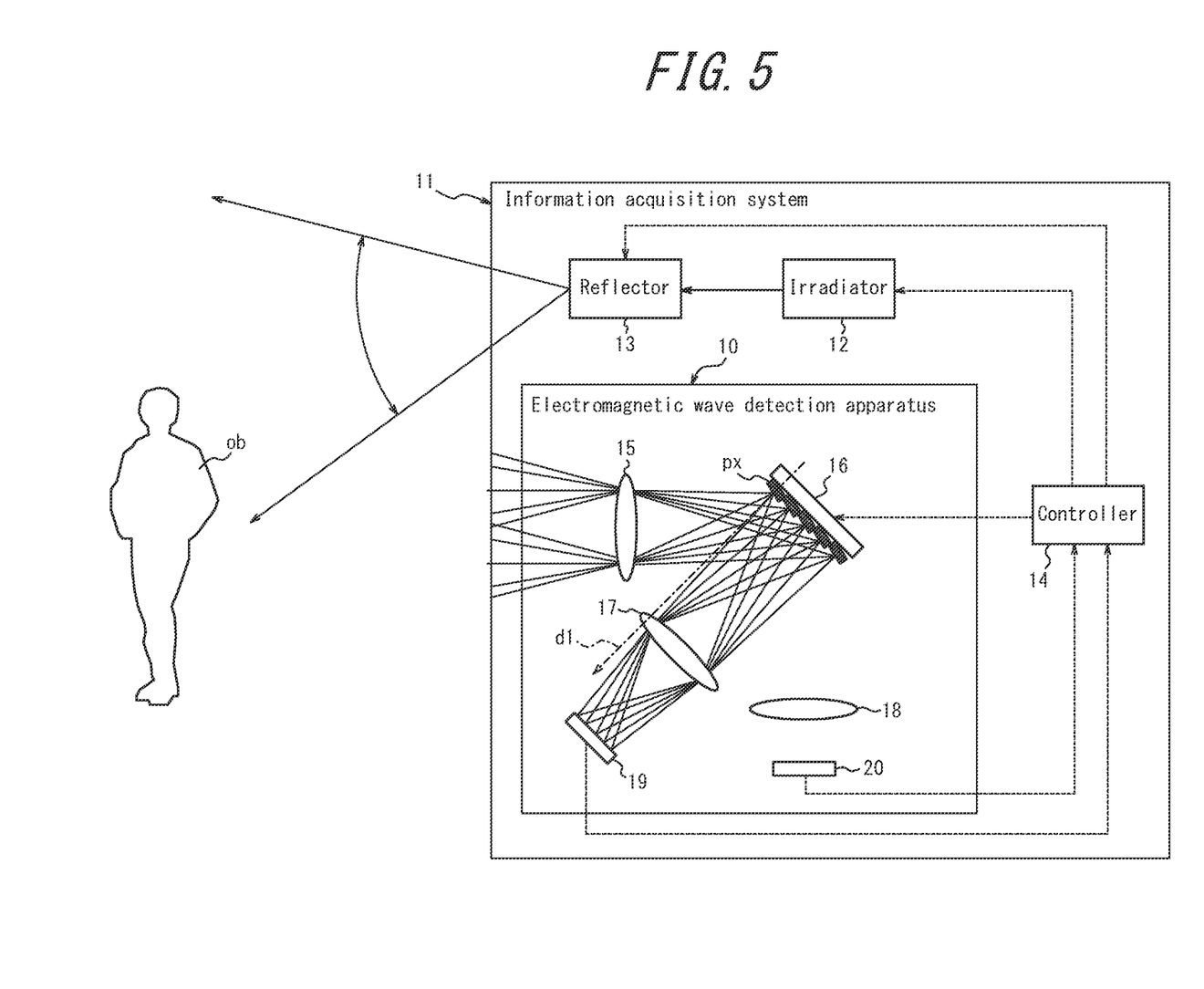
FIG. 5 is a configuration diagram of the information acquisition system to illustrate the travel state of electromagnetic waves when arbitrary pixels of the switch in the first embodiment are in the first state.

At timing t1, the controller 14 causes the first detector 19 to start detecting electromagnetic waves for generating image information of a first frame. At timing t1, all of the pixels px of the switch 16 are in the first state, and the electromagnetic waves incident on the pre-stage optical system 15 reach the first detector 19 (see FIG. 5). At timing t1, the controller 14 also starts the switching of the first pixel px in the switch 16 from the first state to the second state (see "drive signal for first pixel of switch" section), as illustrated in FIG. 4. At timing t1, all of the other pixels px remain in the first state (see "state of second pixel of switch", "state of $N^{th}$ pixel of switch" sections).

Figure 6:
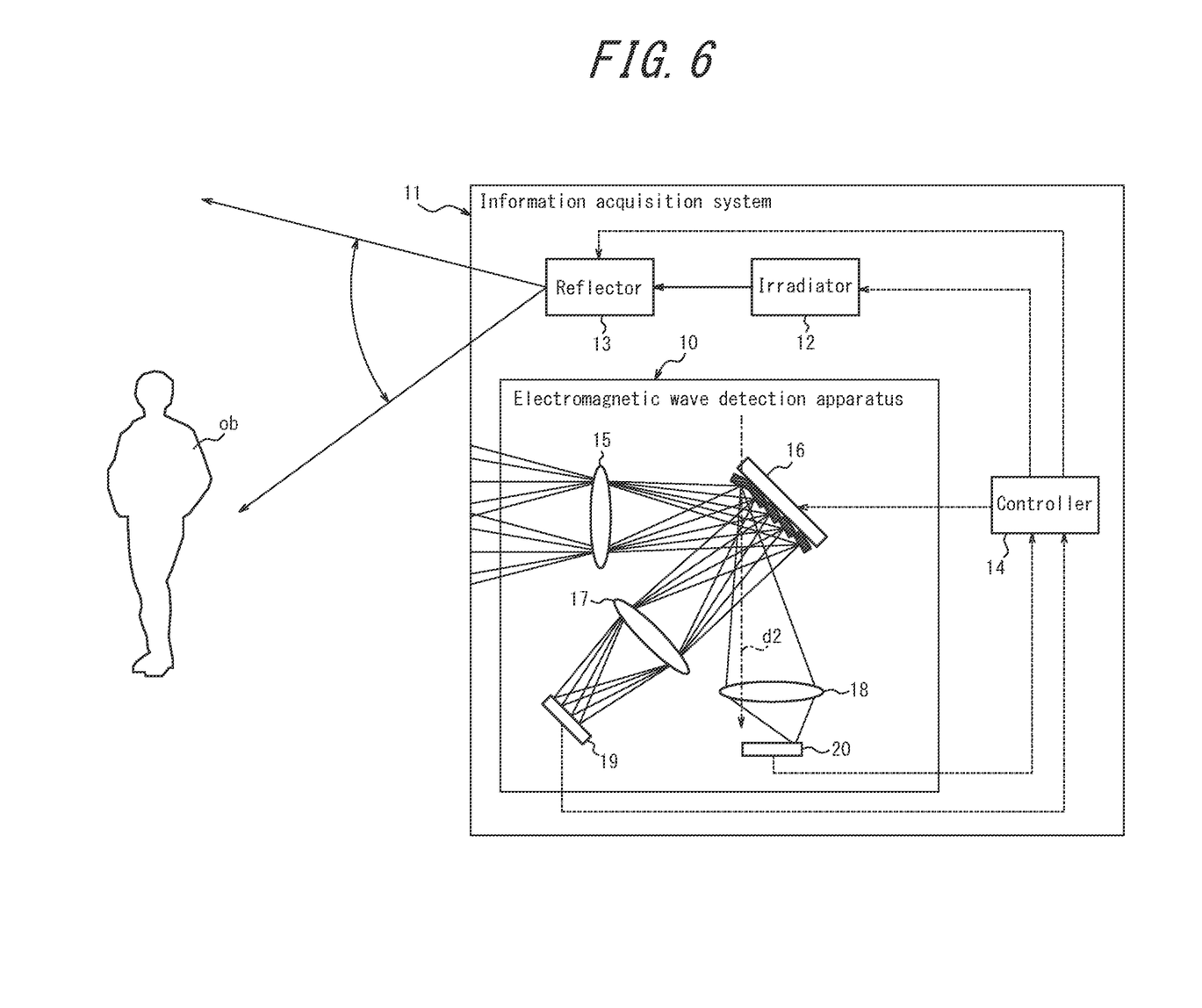
FIG. 6 is a configuration diagram of the information acquisition system to illustrate the travel state of electromagnetic waves when only the arbitrary pixels of FIG. 5 are in the second state.

At timing t2, which is when switching of the first pixel px of the switch 16 from the first state to the second state is complete (see "state of first pixel of switch" section), the controller 14 causes the irradiator 12 to emit electromagnetic waves (see "electromagnetic wave emission timing" section). At timing t2, the first pixel px of the switch 16 switches from the first state (see FIG. 5) to the second state, and the electromagnetic waves that are incident on the pre-stage optical system 15 and form an image on the first pixel px of the switch 16 travel (propagate, advance) in the second direction d2 after the first direction d1 (see FIG. 6).

As illustrated in FIG. 4, the controller 14 causes the second detector 20 to detect electromagnetic waves at timing t2 (see "second detector detection timing" section). The time it takes from when the irradiator 12 irradiates the electromagnetic waves until the electromagnetic waves reach the electromagnetic wave detection apparatus 10 is extremely short compared to the detection time for generating the image information and is, for example, on the order of nanoseconds. Therefore, detection of electromagnetic waves by the second detector 20 is complete in a negligible time and is considered to be the timing t2. The controller 14 acquires the distance information at the irradiation position corresponding to the first pixel px of the switch 16 by calculation based on the detection information acquired at timing t2.

Furthermore, at timing t2, the controller 14 starts the switching of the first pixel px in the switch 16 from the second state to the first state (see "drive signal for first pixel of switch" section). In this way, the controller 14 switches the first pixel px in the switch 16 from the second state to the first state and can thereby cause the device in the first detector 19 corresponding to the first pixel px to detect the electromagnetic waves (visible light) again.

At timing t3, which is when switching of the first pixel px of the switch 16 from the second state to the first state is complete (see "state of first pixel of switch" section), the controller 14 starts the switching of the second pixel px in the switch 16 from the first state to the second state (see "drive signal for second pixel of switch" section). At timing t3, all of the other pixels px remain in the first state (see "state of first pixel of switch", "state of Nt h pixel of switch" sections).

At timing t4, which is when switching of the second pixel px of the switch 16 from the first state to the second state is complete (see "state of second pixel of switch" section), the controller 14 causes the irradiator 12 to emit electromagnetic waves (see "electromagnetic wave emission timing" section). At timing t4, the second pixel px of the switch 16 switches from the first state to the second state, and the electromagnetic waves that are incident on the pre-stage optical system 15 and form an image on the second pixel px of the switch 16 travel (propagate, advance) in the second direction d2 after the first direction d1. The controller 14 causes the second detector 20 to detect electromagnetic waves at timing t4 (see "second detector detection timing" section). The controller 14 acquires the distance information at the irradiation position corresponding to the second pixel px of the switch 16 by calculation based on the detection information acquired at timing t4.

Furthermore, at timing t4, the controller 14 starts the switching of the second pixel px in the switch 16 from the second state to the first state (see "drive signal for second pixel of switch" section). In this way, the controller 14 switches the second pixel px in the switch 16 from the second state to the first state and can thereby cause the device in the first detector 19 corresponding to the second pixel px to detect the electromagnetic waves (visible light) again.

The controller 14 subsequently switches the third pixel px to the $N^{th}$ pixel px in the switch 16 in order, in the same way as the first pixel px, from the first state to the second state and from the second state to the first state. Image information of the first frame is thereby acquired, as is distance information at the irradiation position corresponding to each pixel px.

As described above, the controller 14 is configured to perform control to start switching of the $M^{th}$ pixel px from the first state to the second state at the timing at which switching of the (M−1)th pixel px from the second state to the first state is complete. In this configuration, the switch 16 can switch $T_{img}/T_{dis}$ pixels px from the first state to the second state in a time Tim g for generating one frame of image information. In other words, the controller 14 can generate distance information for $T_{img}/T_{dis}$ pixels px in the time $T_{img}$. M is an integer satisfying 2≤M≤N. $T_{dis}$ is the sum of the time required for switching a pixel px of the switch 16 from the first state to the second state and the time required to return from the second state to the first state. In other words, $T_{dis}$ is the time required to switch an arbitrary pixel px in order from the first state to the second state and back to the first state. In the first embodiment, $T_{img}$ is 1/60 s, for example, and $T_{dis}$ is 1/3000 s.

In a configuration in which the value of $T_{img}/T_{dis}$ is less than the number of pixels in the switch 16, the controller 14 cannot switch all of the pixels px in the switch 16 during the time $T_{img}$. Therefore, during the generation of one frame of image information, the controller 14 cannot generate distance information corresponding to the frame of image information. In other words, during the generation of one frame of image information, the controller 14 can only generate distance information corresponding to less than the frame of image information (for example, 0.5 frames).

To address this issue in a configuration in which the value of $T_{img}/T_{dis}$ is less than the number of pixels in the switch 16, the controller 14 selects a smaller number of pixels px than $T_{img}/T_{dis}$ as targets of switching from among all of the pixels px in the switch 16. Furthermore, the controller 14 controls the reflector 13 so that, at the timing of switching to the second state for each pixel px selected as a target of switching, electromagnetic waves are irradiated onto a region corresponding to the pixel px within the irradiation region.

In a configuration in which the value of $T_{img}/T_{dis}$ is less than the number of pixels in the switch 16, the controller 14 may also perform control so that switching of all pixels px in the switch 16 is complete during a time P×T img for generating the image information of a plurality of frames (P frames, where P is a positive number satisfying P>1). Furthermore, the controller 14 controls the reflector 13 so that, at the timing of switching of each pixel px of the switch 16, electromagnetic waves are irradiated onto a region corresponding to the pixel px within the irradiation region.

In a configuration in which the value of $T_{img}/T_{dis}$ is less than the number of pixels in the switch 16, the controller 14 may divide all of the pixels px in the switch 16 into groups of $T_{img}/T_{dis}$ or fewer pixels px and collectively switch pixels px group by group. Furthermore, the controller 14 may control the reflector 13 so that, at the timing of switching of a pixel px at a position representative of each group (for example, the central position of each group), electromagnetic waves are irradiated onto a region corresponding to the pixel px within the irradiation region.

In a configuration in which the value of $T_{img}/T_{dis}$ is less than the number of pixels in the switch 16, the controller 14 may divide all of the pixels px in the switch 16 into groups of $T_{img}/T_{dis}$ or fewer pixels px and switch only a certain pixel px in each group. Furthermore, the controller 14 may control the reflector 13 so that, at the timing of switching of the certain pixel px, electromagnetic waves are irradiated onto a region corresponding to the pixel px within the irradiation region.

The pixel in the first detector 19 corresponding to a pixel px, of the switch 16, switched to the second state during the capturing time of an image of one frame cannot receive light while the pixel px is in the second state. Therefore, the signal strength dependent on this pixel in the first detector 19 is reduced. The controller 14 may therefore compensate for the reduced signal strength by multiplying the signal value of the pixel in the first detector 19 by a gain. The capturing time of an image of one frame corresponds to the time when the first detector 19 detects electromagnetic waves for generating one frame of image information.

In a configuration in which the scanning rate by the reflector 13 is faster than the switching rate of a pixel px, i.e. when $T_{scn}$ is shorter than $T_{dis}$, the controller 14 may start switching of the $M^{th}$ pixel px from the first state to the second state before the timing at which switching of the (M−1)th pixel px from the second state to the first state is complete. $T_{scn}$ is the time required for the irradiation position of electromagnetic waves emitted from the irradiator 12 and reflected by the reflector 13 to change from a certain irradiation position to the next irradiation position, or the time required to change from a certain irradiation position to an adjacent irradiation position. In this configuration, distance information can be generated at more pixels in a shorter time than when another pixel is switched to the second state only after switching of an arbitrary pixel px from the second state to the first state is complete.

As illustrated in FIG. 4, the controller 14 starts detection of electromagnetic waves for generating image information of a second frame at t5, which is when the time $T_{img}$ required to generate image information of the first frame has elapsed from timing t1 (see "first detector detection timing" section). After detection of electromagnetic waves by the first detector 19 from timing t1 to t5 is finished, the controller 14 acquires the image information of the first frame based on the electromagnetic waves detected during that time. Subsequently, the controller 14 controls the irradiator 12, the reflector 13, the switch 16, the first detector 19, and the second detector 20 to acquire the image information and the distance information in the same way as the control from timing t1 to t5.

The electromagnetic wave detection apparatus 10 of the first embodiment with the above configuration can switch each pixel px disposed on the action surface as of the switch 16 between the first state and the second state. The electromagnetic wave detection apparatus 10 of the first embodiment with this configuration can align the optical axis of the pre-stage optical system with the optical axis of the first post-stage optical system 17 in the first direction d1 in which electromagnetic waves are caused to travel (propagate, advance) in the first state and with the optical axis of the second post-stage optical system 18 in the second direction d2 in which electromagnetic waves are caused to travel (propagate, advance) in the second state. Accordingly, the electromagnetic wave detection apparatus 10 of the first embodiment can reduce the misalignment between the optical axes of the first detector 19 and the second detector 20 by switching the pixels px of the switch 16 between the first state and the second state. The electromagnetic wave detection apparatus of the first embodiment can thereby reduce the misalignment of detection axes in the first detector 19 and the second detector 20. Therefore, the electromagnetic wave detection apparatus 10 of the first embodiment can reduce the misalignment of coordinate systems in the detection results of the first detector 19 and the second detector 20. The effects of such a configuration are the same for the electromagnetic wave detection apparatus 100 of the second embodiment and the electromagnetic wave detection apparatus 101 of the third embodiment, described below.

The electromagnetic wave detection apparatus 10 of the first embodiment can switch a portion of the pixels px in the switch 16 to the first state and switch another portion of the pixels px to the second state. Accordingly, the electromagnetic wave detection apparatus 10 of the first embodiment can cause the first detector 19 to detect electromagnetic waves at a portion of pixels px while simultaneously causing the second detector 20 to detect electromagnetic waves at another portion of pixels px. The electromagnetic wave detection apparatus 10 of the first embodiment can thereby simultaneously acquire information relating to different regions. The effects of such a configuration are the same for the electromagnetic wave detection apparatus 100 of the second embodiment and the electromagnetic wave detection apparatus 101 of the third embodiment, described below.

The electromagnetic wave detection apparatus 10 of the first embodiment can switch the same pixel px in the switch 16 to the first state and then to the second state. With this configuration, the first detector 19 can detect electromagnetic waves when the pixel px in the switch 16 is in the first state, and immediately thereafter, the second detector 20 can detect electromagnetic waves when the pixel px is in the second state. The electromagnetic wave detection apparatus 10 of the first embodiment can therefore reduce the misalignment in the timing of electromagnetic wave detection by the first detector 19 and the second detector 20 for the same pixel px in the switch 16. The electromagnetic wave detection apparatus 10 of the first embodiment can thereby reduce misalignment in the timing at which information relating to the same region is acquired. The effects of such a configuration are the same for the electromagnetic wave detection apparatus 100 of the second embodiment and the electromagnetic wave detection apparatus 101 of the third embodiment, described below.

The information acquisition system 11 of the first embodiment includes the irradiator 12. Accordingly, by irradiating electromagnetic waves onto the object ob, the information acquisition system 11 of the first embodiment can cause the second detector 20 to function as an active sensor. The information acquisition system 11 of the first embodiment can also cause the first detector 19 to function as a passive sensor. With this configuration, the electromagnetic wave detection apparatus 10 of the first embodiment can switch at least one of the pixels px in the switch 16 from the first state to the second state to cause both an active sensor and a passive sensor to acquire information relating to the same region. Furthermore, with this configuration, the electromagnetic wave detection apparatus 10 of the first embodiment can switch a portion of the pixels px in the switch 16 to the first state and switch another portion of the pixels px to the second state to separate the region in which the active sensor acquires information from the region in which the passive sensor acquires information.

The information acquisition system 11 of the first embodiment includes the reflector 13. With this configuration, the information acquisition system 11 can scan the object ob using electromagnetic waves emitted by the irradiator 12. In other words, the information acquisition system 11 of the first embodiment can cause the second detector 20 to cooperate with the reflector 13 and function as a scanning-type active sensor. Accordingly, the information acquisition system 11 of the first embodiment can use the second detector 20 to acquire information in accordance with positions in one or two dimensions.

Next, an electromagnetic wave detection apparatus according to a second embodiment of the present disclosure is described. The second embodiment differs from the first embodiment by not including a reflector or an irradiator and by having a different configuration and functions for the second detector. The second embodiment is described below, focusing on the differences from the first embodiment. The same reference signs are used for components with the same configuration as in the first embodiment.

Figure 7:
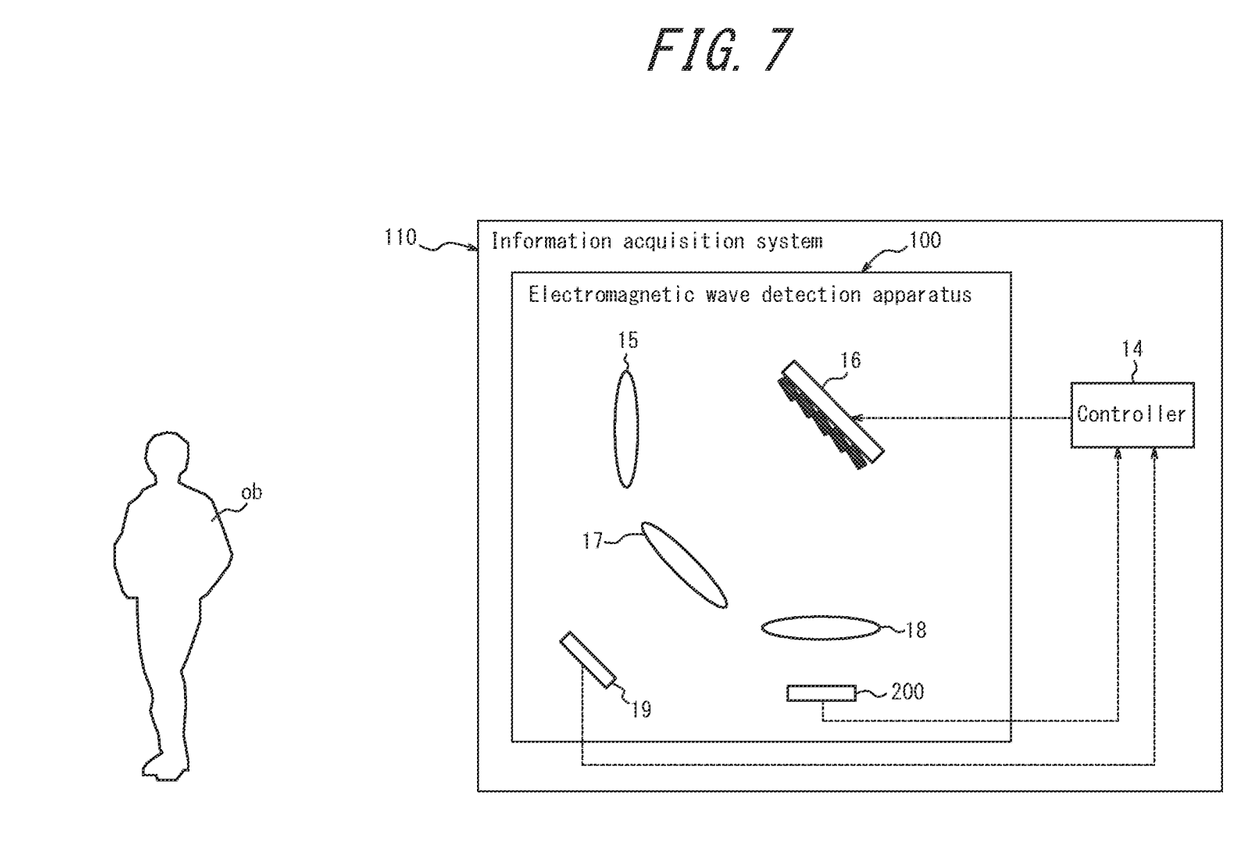
FIG. 7 is a configuration diagram schematically illustrating an information acquisition system that includes an electromagnetic wave detection apparatus according to a second embodiment.

As illustrated in FIG. 7, an information acquisition system 110 that includes an electromagnetic wave detection apparatus 100 according to the second embodiment is configured to include the electromagnetic wave detection apparatus 100 and a controller 14.

The electromagnetic wave detection apparatus 100 includes a pre-stage optical system 15, a switch 16, a first post-stage optical system 17, a second post-stage optical system 18, a first detector 19, and a second detector 200, like the first embodiment. The configuration and functions of the pre-stage optical system 15, the switch 16, the first post-stage optical system 17, the second post-stage optical system 18, and the first detector 19 in the second embodiment are the same as in the first embodiment.

The second detector 200 is provided along the path of electromagnetic waves that travel (propagate, advance) through the second post-stage optical system 18 after traveling (propagating, advancing) in the second direction d2 from the switch 16, like the first embodiment. The second detector 200 detects electromagnetic waves that pass through the second post-stage optical system 18, i.e. electromagnetic waves that travel (propagate, advance) in the second direction d2, like the first embodiment.

The second detector 200 in the second embodiment has the same configuration and functions as the first detector 19 and captures an image of the same type of electromagnetic waves as the first detector 19. Accordingly, like the first detector 19, it suffices for the second detector 200 in the second embodiment to be provided at or near a secondary image formation position, which is a position of image formation by the second post-stage optical system 18 of an image that is formed by the pre-stage optical system 15 at or near the switch 16 and then travels (propagates, advances) in the second direction d2.

The controller 14 acquires information related to the surroundings of the electromagnetic wave detection apparatus 100 based on electromagnetic waves detected by each of the first detector 19 and the second detector 200, like the first embodiment. In the second embodiment, the controller 14 acquires image information in the form of electromagnetic waves detected as an image by each of the first detector 19 and the second detector 200, as described above.

The controller 14 controls the switch 16, the first detector 19, and the second detector 200 to repeatedly acquire image information alternately from the first detector 19 and the second detector 200. The control of each portion to repeatedly acquire the image information alternately is described below with reference to the timing chart in FIG. 8.

Figure 8:
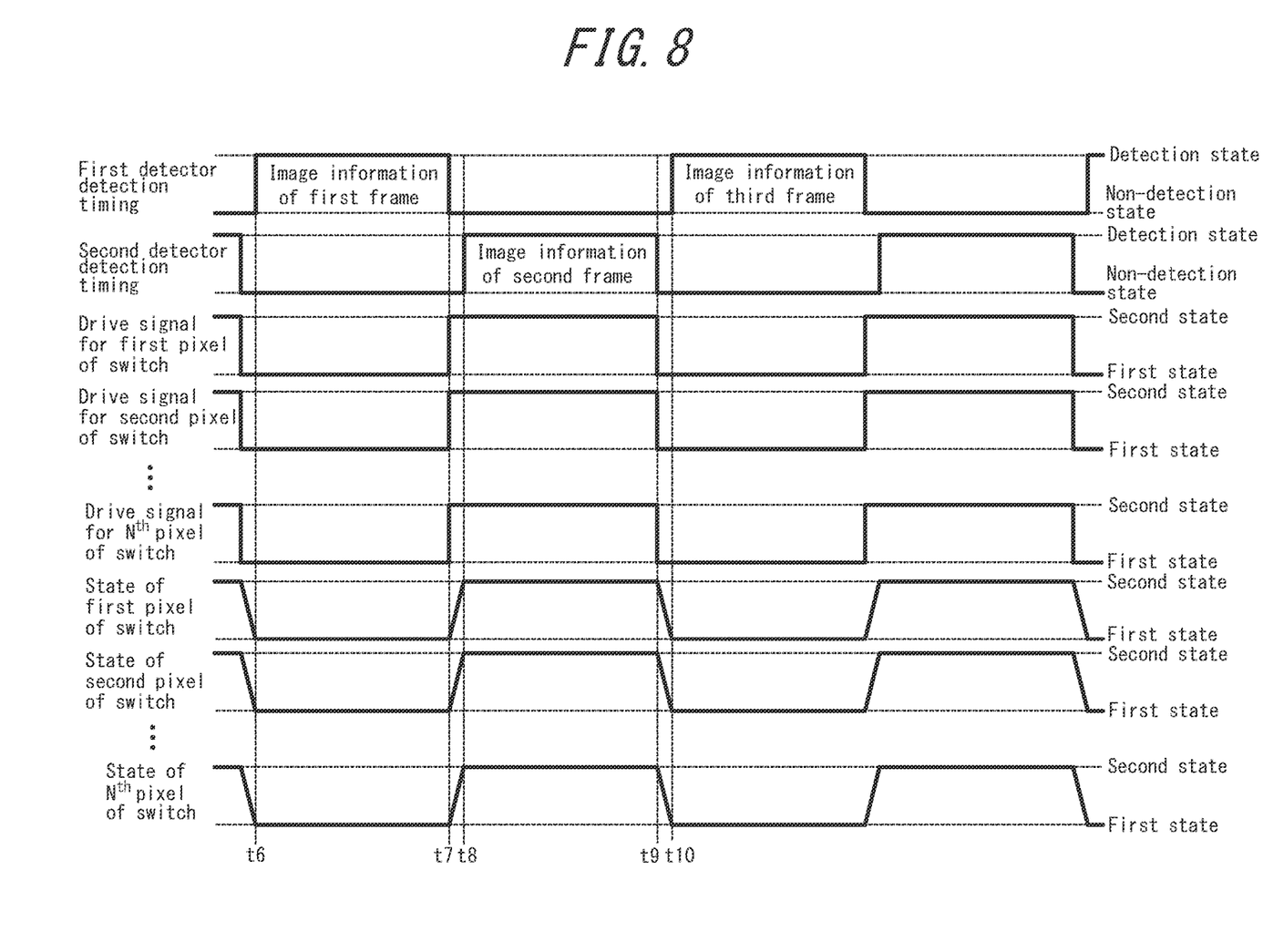
FIG. 8 is a timing chart to illustrate control of each portion for a controller in the second embodiment to repeatedly acquire image information alternately from a first detector and a second detector.

At timing t6, which is when switching of all of the pixels px of the switch 16 to the first state is complete (see "state of first pixel of switch", "state of second pixel of switch", and "state of $N^{th}$ pixel of switch" sections), the controller 14 causes the first detector 19 to start detecting electromagnetic waves for generating image information of the first frame.

At t7, which is when the time to detect electromagnetic waves for generating one frame of image information has elapsed from timing t6 (see "first detector detection timing" section), the controller 14 starts switching of all of the pixels px in the switch 16 from the first state to the second state (see "drive signal for first pixel of switch", "drive signal for second pixel of switch", and "drive signal for $N^{th}$ pixel of switch" sections).

At timing t8, which is when switching of all of the pixels px of the switch 16 to the second state is complete (see "state of first pixel of switch", "state of second pixel of switch", and "state of $N^{th}$ pixel of switch" sections), the controller 14 causes the second detector 200 to start detecting electromagnetic waves for generating image information of the second frame and starts acquiring the image information of the first frame based on the electromagnetic waves detected by the first detector 19 from timing t6 to t7.

At t9, which is when the time to detect electromagnetic waves for generating image information of the second frame has elapsed from timing t8 (see "second detector detection timing" section), the controller 14 starts switching of all of the pixels px in the switch 16 from the second state to the first state (see "drive signal for first pixel of switch", "drive signal for second pixel of switch", "drive signal for $N^{th}$ pixel of switch" sections).

At timing t10, which is when switching of all of the pixels px of the switch 16 to the first state is complete (see "state of first pixel of switch", "state of second pixel of switch", and "state of $N^{th}$ pixel of switch" sections), the controller 14 causes the first detector 19 to start detecting electromagnetic waves for generating image information of the third frame and starts acquiring the image information of the second frame based on the electromagnetic waves detected by the second detector 200 from timing t8 to t9. Subsequently, the controller 14 controls the switch 16, the first detector 19, and the second detector 200 to acquire the image information in the same way as the control from timing t6 to t10.

In this way, the electromagnetic wave detection apparatus 100 of the second embodiment can output image information based on the electromagnetic waves detected by the first detector 19 while the second detector 200 is detecting electromagnetic waves and can output image information based on the electromagnetic waves detected by the second detector 200 while the first detector 19 is detecting electromagnetic waves. Accordingly, the electromagnetic wave detection apparatus 100 of the second embodiment can achieve a frame rate for the apparatus overall that is twice the frame rate of the first detector 19 and the second detector 200.

In the above-described control for one of the first detector 19 and the second detector 200 to output detected information while the other is detecting electromagnetic waves, the detection time of an image of one frame is shorter than when the first detector 19 or the second detector 200 each independently operates at the actual frame rate. Therefore, the amount of light that each pixel receives in the first detector 19 and the second detector 200 is less than when the detectors independently operate at the actual frame rate, and the signal strength is reduced. The controller 14 may therefore compensate for the reduced signal strength by multiplying the signal value of each pixel in the first detector 19 and the second detector 200 by a gain.

Next, an electromagnetic wave detection apparatus according to a third embodiment of the present disclosure is described. The third embodiment differs from the first embodiment by including a plurality of irradiators and by having a different configuration and functions for the first detector. The third embodiment is described below, focusing on the differences from the first embodiment. The same reference signs are used for components with the same configuration as in the first embodiment.

Figure 9:
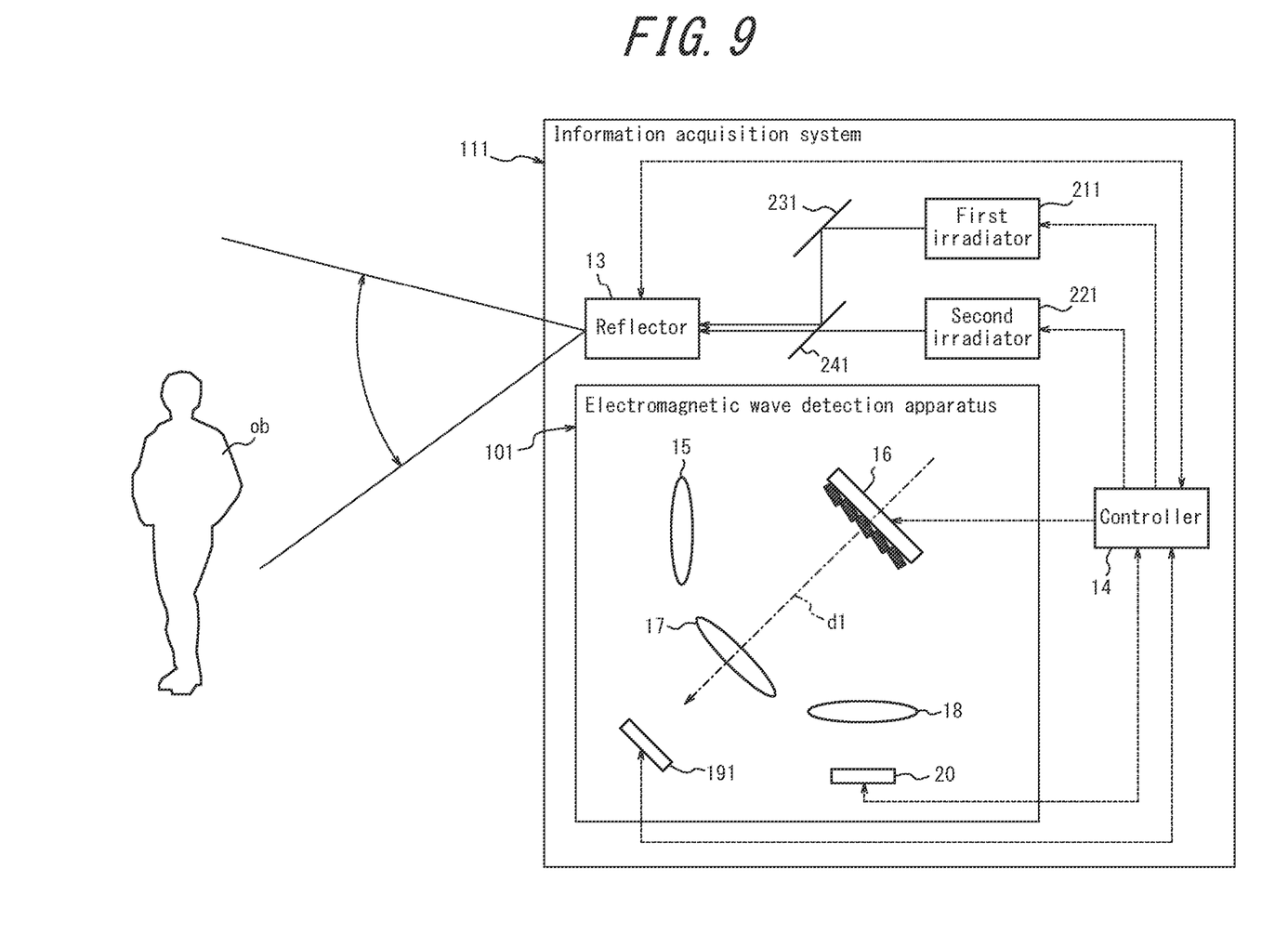
FIG. 9 is a configuration diagram schematically illustrating an information acquisition system that includes an electromagnetic wave detection apparatus according to a third embodiment.

As illustrated in FIG. 9, an information acquisition system 111 that includes an electromagnetic wave detection apparatus 101 according to the third embodiment is configured to include the electromagnetic wave detection apparatus 101, a first irradiator 211, a second irradiator 221, a first mirror 231, a second mirror 241, a reflector 13, and a controller 14. In the third embodiment, the configuration and functions of the reflector 13 are similar to those of the first embodiment. The reflector 13 in the third embodiment differs by reflecting electromagnetic waves emitted from the first irradiator 211 and the second irradiator 221.

In the third embodiment, the cooperative function of the first detector 191, the reflector 13, and the controller 14 is similar to that of the first embodiment. The first detector 191 in the third embodiment differs from the first embodiment by detecting reflected waves, from an object ob, of electromagnetic waves irradiated towards the object ob after being irradiated by the first irradiator 211 and reflected by the reflector 13. Accordingly, the first detector 191 in the third embodiment cooperates with the reflector 13 to form a scanning-type active sensor.

The electromagnetic wave detection apparatus 101 includes a pre-stage optical system 15, a switch 16, a first post-stage optical system 17, a second post-stage optical system 18, the first detector 191, and a second detector 200, like the first embodiment. The configuration and functions of the pre-stage optical system 15, the switch 16, the first post-stage optical system 17, the second post-stage optical system 18, and the second detector 20 in the third embodiment are the same as in the first embodiment.

The first irradiator 211 in the third embodiment emits a different type of electromagnetic waves than the second irradiator 221. In greater detail, the first irradiator 211 in the third embodiment emits visible light rays. The first irradiator 211 emits a narrow beam, for example 0.5°, of electromagnetic waves. The first irradiator 211 emits electromagnetic waves in pulses or continuously. For example, the first irradiator 211 is an LED or an LD. The first irradiator 211 switches between emitting and not emitting electromagnetic waves based on control by the controller 14, described below.

The second irradiator 221 in the third embodiment emits infrared rays, like the irradiator 12 in the first embodiment.

The first mirror 231 is provided in the emission direction of electromagnetic waves emitted by the first irradiator 211. The first mirror 231 reflects the electromagnetic waves emitted by the first irradiator 211.

The second mirror 241 is provided in the emission direction of electromagnetic waves emitted by the second irradiator 221 and in the direction in which the first mirror 231 reflects electromagnetic waves emitted by the first irradiator 211. The second mirror 241 reflects the electromagnetic waves emitted by the first irradiator 211 and reflected by the first mirror 231, whereas the second mirror 241 transmits the electromagnetic waves emitted by the second irradiator 221. The second mirror 241 is implemented by a one-way mirror, a dichroic mirror, or the like.

The first irradiator 211, the second irradiator 221, the first mirror 231, and the second mirror 241 may be arranged so that the beam of electromagnetic waves emitted by the first irradiator 211 and reflected by the second mirror 241 overlaps, or does not overlap, with the beam of electromagnetic waves emitted by the second irradiator 221 and transmitted by the second mirror 241. In the third embodiment, the first irradiator 211, the second irradiator 221, the first mirror 231, and the second mirror 241 are arranged so that the beam of electromagnetic waves emitted by the first irradiator 211 and reflected by the second mirror 241 overlaps with the beam of electromagnetic waves emitted by the second irradiator 221 and transmitted by the second mirror 241.

In this way, the electromagnetic wave detection apparatus 101 of the third embodiment can cause the reflector 13 to scan the beam of electromagnetic waves emitted from the first irradiator 211 and the second irradiator 221 and can thereby scan the same region simultaneously using electromagnetic waves irradiated from different irradiators.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

For example, in the first embodiment, the irradiator 12, the reflector 13, and the controller 14 form the information acquisition system 11 along with the electromagnetic wave detection apparatus 10, but the electromagnetic wave detection apparatus 10 may be configured to include at least one of these components. Similarly, in the second embodiment, the controller 14 forms the information acquisition system 110 along with the electromagnetic wave detection apparatus 100, but the electromagnetic wave detection apparatus 100 may be configured to include the controller 14. In the third embodiment as well, the first irradiator 211, the second irradiator 221, the first mirror 231, the second mirror 241, the reflector 13, and the controller 14 form the information acquisition system 111 along with the electromagnetic wave detection apparatus 101, but the electromagnetic wave detection apparatus 101 may be configured to include at least one of these components.

In the first through third embodiments, the switch 16 can switch the travel direction of the electromagnetic waves incident on the action surface as between two directions, i.e. the first direction d1 and the second direction d2, but the switch 16 may instead be capable of switching the travel direction among three or more directions.

In the switch 16 of the first through third embodiments, the first state is a first reflecting state for reflecting the electromagnetic waves incident on the action surface as in the first direction d1, and the second state is a second reflecting state for reflecting these electromagnetic waves in the second direction d2. This configuration is not, however, limiting.

For example, the second state may be a transmitting state for transmitting the electromagnetic waves incident on the action surface as for the electromagnetic waves to travel (propagate, advance) in the second direction d2. In greater detail, the switch 16 may include a shutter, on each pixel px, that has a reflecting surface that reflects electromagnetic waves. The switch 16 with this configuration can open and close the shutter of each pixel px to switch each pixel px between the first reflecting state and the transmitting state that is the second reflecting state. An example of the switch 16 with such a configuration is a switch that includes a MEMS shutter including a plurality of openable shutters arranged in an array. Another example of the switch 16 is a switch that includes a liquid crystal shutter capable of switching, in accordance with liquid crystal orientation, between the reflecting state for reflecting electromagnetic waves and the transmitting state for transmitting electromagnetic waves. The switch 16 with this configuration can switch each pixel px between the reflecting state as the first state and the transmitting state as the second state by switching the liquid crystal orientation of each pixel px.

In the first embodiment, the information acquisition system 11 is configured so that the reflector 13 scans the beam of electromagnetic waves emitted by the irradiator 12, thereby causing the second detector 20 to cooperate with the reflector 13 and function as a scanning-type active sensor. The information acquisition system 11 is not, however, limited to this configuration. For example, the information acquisition system 11 can achieve similar effects as in the first embodiment, without including the reflector 13, by causing electromagnetic waves to be emitted radially from the irradiator 12 and by acquiring information without scanning.

In the information acquisition system 11 of the first embodiment, the first detector 19 is a passive sensor, and the second detector 20 is an active sensor. The information acquisition system 11 is not, however, limited to this configuration. For example, the information acquisition system 11 can achieve similar effects as in the first embodiment when the first detector 19 and the second detector 20 are both active sensors or both passive sensors.

The electromagnetic wave detection apparatus 100 of the second embodiment is configured so that the first detector 19 and the second detector 200 capture images of the same type of electromagnetic waves. The electromagnetic wave detection apparatus 100 is not, however, limited to this configuration. For example, the electromagnetic wave detection apparatus 100 can achieve similar effects as in the second embodiment when the first detector 19 and the second detector 200 detect different types of electromagnetic waves.

The electromagnetic wave detection apparatus 100 of the second embodiment is also configured so that the first detector 19 and the second detector 200 are both passive sensors. The electromagnetic wave detection apparatus 100 is not, however, limited to this configuration. For example, the electromagnetic wave detection apparatus 100 can achieve similar effects as in the second embodiment when one of the first detector 19 and the second detector 200 is a passive sensor and the other is an active sensor, or when both are active sensors.

In the third embodiment, the information acquisition system 111 is configured so that the reflector 13 scans the beams of electromagnetic waves emitted by the first irradiator 211 and the second irradiator 221, thereby causing the first detector 19 and the second detector 20 to function as scanning-type active sensors. The information acquisition system 111 is not, however, limited to this configuration. For example, the information acquisition system 111 can achieve similar effects as in the third embodiment, without including the reflector 13, by causing electromagnetic waves to be emitted radially from the first irradiator 211 and the second irradiator 221 and by acquiring image information without scanning.

In the third embodiment, the information acquisition system 111 is configured so that the reflector 13 scans the beams of electromagnetic waves emitted by the first irradiator 211 and the second irradiator 221, thereby causing the first detector 19 and the second detector 20 to function as scanning-type active sensors. The information acquisition system 111 is not, however, limited to this configuration. For example, the information acquisition system 111 can achieve similar effects as in the third embodiment by causing electromagnetic waves to be emitted radially from only one of the first irradiator 211 and the second irradiator 221 and by acquiring image information related to the radially emitted electromagnetic waves without scanning by the reflector 13.

In the third embodiment, the information acquisition system 111 is configured to scan the same region with different irradiators by the reflector 13 scanning electromagnetic waves emitted from the first irradiator 211 and the second irradiator 221. The information acquisition system 111 is not, however, limited to this configuration. For example, the information acquisition system 111 may include only one of the first irradiator 211 and the second irradiator 221 and be configured to divide the electromagnetic waves emitted from the one irradiator into a plurality of directions and cause the reflector 13 to scan the divided electromagnetic waves. The information acquisition system 111 with this configuration can simultaneously scan different regions with one irradiator.

The information acquisition system 111 in the third embodiment is configured to use the first mirror 231 and the second mirror 241 to cause electromagnetic waves emitted from the first irradiator 211 and the second irradiator 221 to be incident on a single reflector 13 and to change the irradiation position on the object ob. The information acquisition system 111 is not, however, limited to this configuration. For example, the information acquisition system 111 can achieve similar effects as in the third embodiment when configured so that electromagnetic waves emitted by the first irradiator 211 and the second irradiator 221 are incident on a plurality of reflectors 13.

The information acquisition system 111 in the third embodiment is configured so that the first irradiator 211 and the second irradiator 221 emit different types of electromagnetic waves. The information acquisition system 111 is not, however, limited to this configuration. For example, the information acquisition system 111 can achieve similar effects as in the third embodiment when configured so that the first irradiator 211 and the second irradiator 221 emit the same type of electromagnetic waves.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

REFERENCE SIGNS LIST 10, 100, 101 Electromagnetic wave detection apparatus
11, 110, 111 Information acquisition system
12 Irradiator
13 Reflector
14 Controller
15 Pre-stage optical system
16 Switch
17 First post-stage optical system
18 Second post-stage optical system
19, 191 First detector
200 Second detector
211 First irradiator
221 Second irradiator
231 First mirror
241 Second mirror
as Action surface
d1 First direction
d2 Second direction
ob Object
px, px1, px2 Pixel

The invention claimed is:

1. An electromagnetic wave detection apparatus comprising:
an irradiator configured to emit electromagnetic waves:
a switch comprising an action surface with a plurality of pixels disposed thereon, the switch being configured to switch each pixel between a first state of causing electromagnetic waves, including reflected waves, from an object, of electromagnetic waves irradiated from the irradiator, incident on the action surface to travel in a first direction and a second state of causing the electromagnetic waves incident on the action surface to travel in a second direction;
a first detector, which is a passive detector, configured to detect the electromagnetic waves that travel in the first direction;
a second detector, which is an active detector, configured to detect the electromagnetic waves that travel in the second direction; and
a controller configured to compensate for a signal strength, corresponding to electromagnetic waves travelling to the second detector, in the first detector, such that the controller is configured to compensate for a reduced signal strength by the electromagnetic waves travelling to the second detector, in the first detector, and
wherein the switch is configured to switch each of the plurality of pixels between the first state and the second state according to an irradiation region of the electromagnetic waves emitted from the irradiator.

2. The electromagnetic wave detection apparatus of claim 1, further comprising a reflector configured to change the irradiation region, wherein the switch is configured to switch each of the plurality of pixels between the first state and the second state according to the irradiation region changed by the reflector.

3. The electromagnetic wave detection apparatus of claim 1, wherein, each time the electromagnetic waves are emitted from the irradiator, the switch is configured to switch the pixel corresponding to the irradiation region from the first state to the second state among the plurality of pixels and to put another pixel in the first state.

4. The electromagnetic wave detection apparatus of claim 1, wherein the first detector comprises an image sensor and the second detector comprises a ranging sensor.

5. The electromagnetic wave detection apparatus of claim 1, wherein
in a configuration in which a scanning rate by a reflector is faster than a switching rate of a pixel, the controller is configured to start switching of an $M^{th}$ pixel from the first state to the second state before a timing at which switching of an $(M-1)^{th}$ pixel from the second state to the first state is complete.

* * * * *